US009369392B2

(12) United States Patent
Norlander et al.

(10) Patent No.: US 9,369,392 B2
(45) Date of Patent: Jun. 14, 2016

(54) SCTP BUNDLING

(71) Applicant: Telefonaktiebolaget L M Ericsson (publ), Stockholm (SE)

(72) Inventors: Magnus Norlander, Gothenburg (SE); Loudon Lee Campbell, Plano, TX (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 230 days.

(21) Appl. No.: 14/104,125

(22) Filed: Dec. 12, 2013

(65) Prior Publication Data
US 2015/0163149 A1    Jun. 11, 2015

(30) Foreign Application Priority Data
Dec. 6, 2013   (WO) ................. PCT/EP2013/075839

(51) Int. Cl.
*G01R 31/08* (2006.01)
*H04L 12/851* (2013.01)
*H04L 12/801* (2013.01)
*H04L 12/853* (2013.01)

(52) U.S. Cl.
CPC ............. *H04L 47/24* (2013.01); *H04L 47/12* (2013.01); *H04L 47/19* (2013.01); *H04L 47/2416* (2013.01)

(58) Field of Classification Search
USPC ................. 370/252, 465, 469, 473, 474
See application file for complete search history.

(56) References Cited

U.S. PATENT DOCUMENTS 7,304,948 B1 * 12/2007 Ong ................. H04L 47/10
                                                    370/230.1
7,996,642 B1 *  8/2011 Smith .............. G06F 12/0246
                                                    711/154
(Continued)

FOREIGN PATENT DOCUMENTS

WO        2007110096 A1    10/2007

OTHER PUBLICATIONS

Stewart, R., et al., "Stream Control Transmission Protocol; rfc4960. txt", Sep. 1, 2007, pp. 1-152, XP015052496.
(Continued)

*Primary Examiner* — Ricky Ngo
*Assistant Examiner* — Christine Ng
(74) *Attorney, Agent, or Firm* — Rothwell, Figg, Ernst & Manbeck, P.C.

(57) ABSTRACT

A method for transmitting upper layer application messages into a SCTP packet in which messages are bundled into a packet comprising a SCTP header and a payload. The method comprises receiving messages from an upper layer application; processing messages through a first process stage in which messages may be added to a first buffer for bundling and then to a secondary process stage in which the bundled messages/messages may be further stored in a second buffer until receiver window and congestion window properties are found to be allowable for transmission; transmitting a SCTP packet of bundled messages; receiving an upper layer application message; resolving the time criticality of the message; if high time criticality, transmitting further the message in a payload portion of a SCTP packet to the secondary stage, otherwise processing the message in the first stage so as to potentially bundle the message with other messages.

22 Claims, 11 Drawing Sheets

(56) References Cited

U.S. PATENT DOCUMENTS

| | | | |
|---|---|---|---|
| 2001/0011296 A1* | 8/2001 | Chidambaran | H04L 29/06 709/203 |
| 2004/0028009 A1* | 2/2004 | Dorenbosch | H04W 36/0011 370/329 |
| 2007/0171828 A1* | 7/2007 | Dalal | H04L 47/365 370/235 |
| 2007/0258508 A1* | 11/2007 | Werb | H04W 24/02 375/140 |
| 2010/0020689 A1* | 1/2010 | Tang | H04L 47/10 370/235 |
| 2010/0332876 A1* | 12/2010 | Fields, Jr. | G06F 1/3203 713/323 |
| 2011/0261758 A1 | 10/2011 | Hapsari et al. | |
| 2012/0051222 A1* | 3/2012 | Ogura | H04L 47/245 370/237 |

OTHER PUBLICATIONS

Stewart, R., et al., "Sockets API Extensions for the Stream Control Transmission Protocol (SCTP); rfc6458.txt", Sockets API Extensions for the Stream Control Transmission Protocol (SCTP); RFC6458.txt, Internet Engineering Task Force, IETF; Standard, Internet Society (ISOC), 4, Rue Des Falaises CH-1205 Geneva, Switzerland, Dec. 11, 2011, pp. 1-115, XP015081378.

International Seach Repot issued in Internatonal applicaton No. PCT/EP2013/075839 on Aug. 7, 2014 4 pages.

* cited by examiner

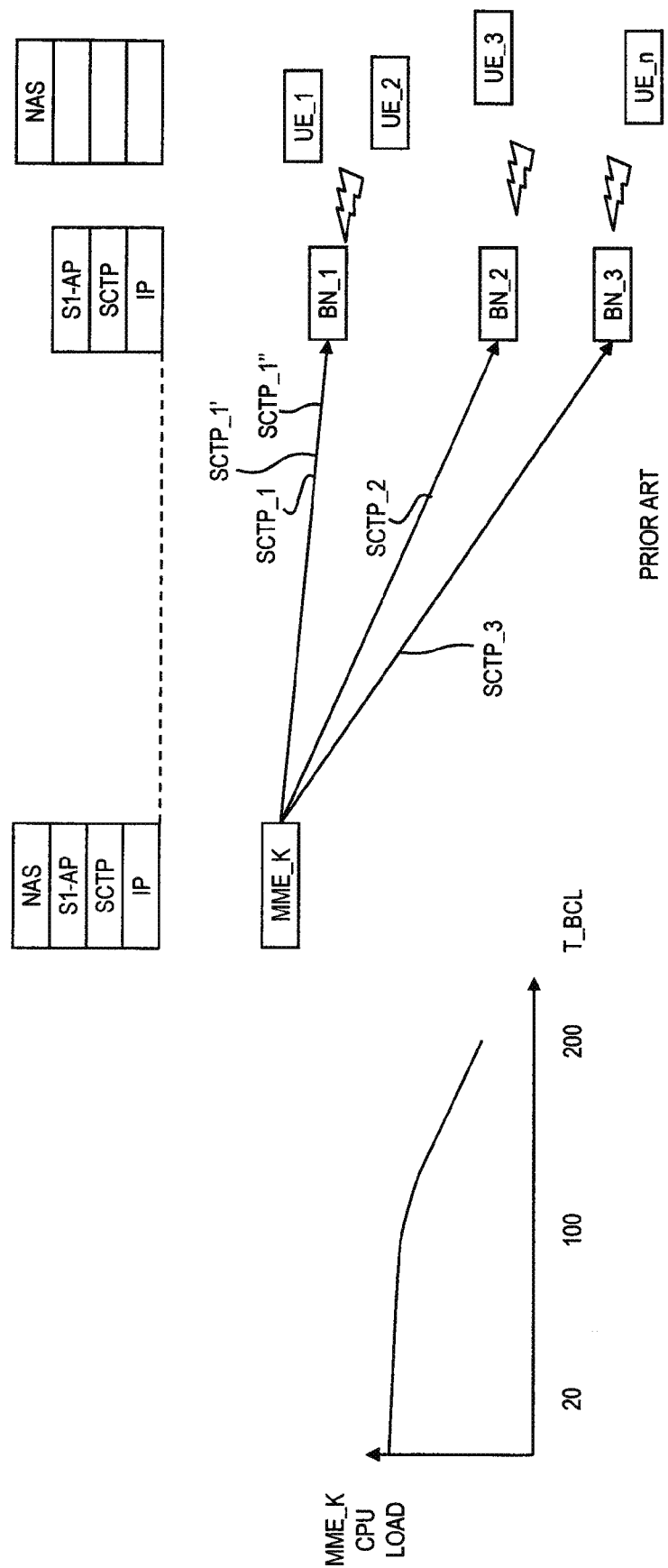

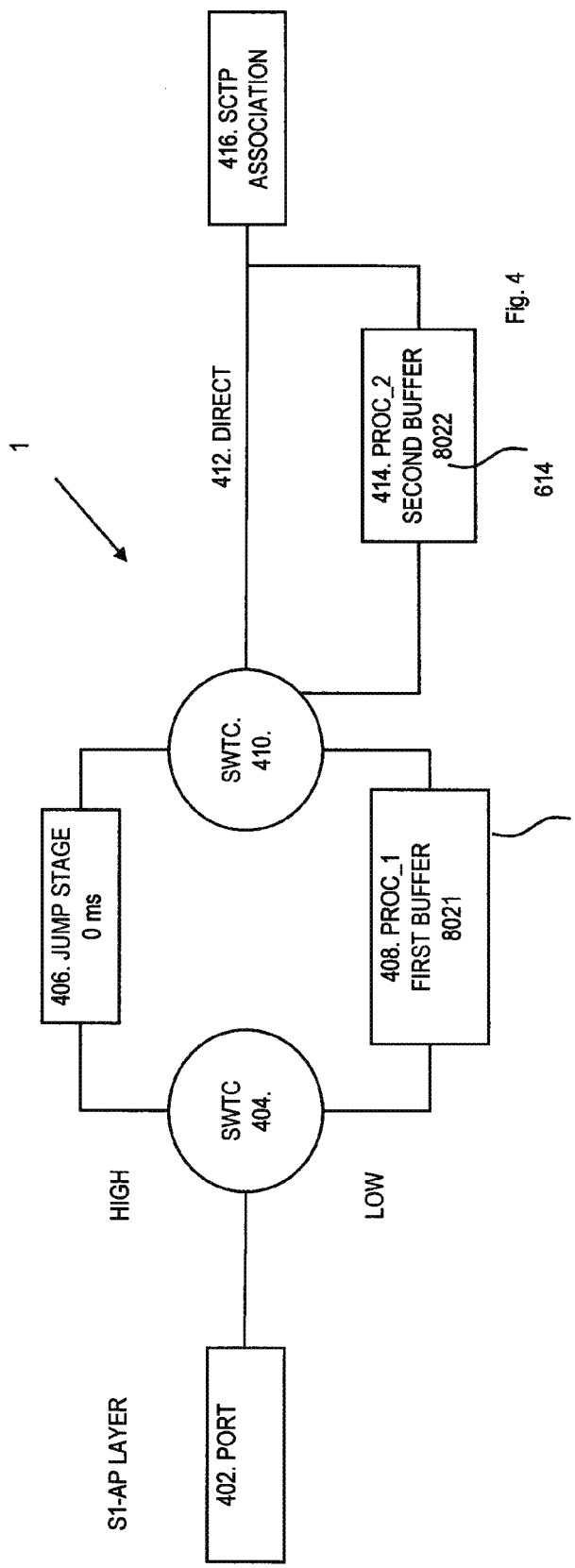
Fig. 5 – EMB. I

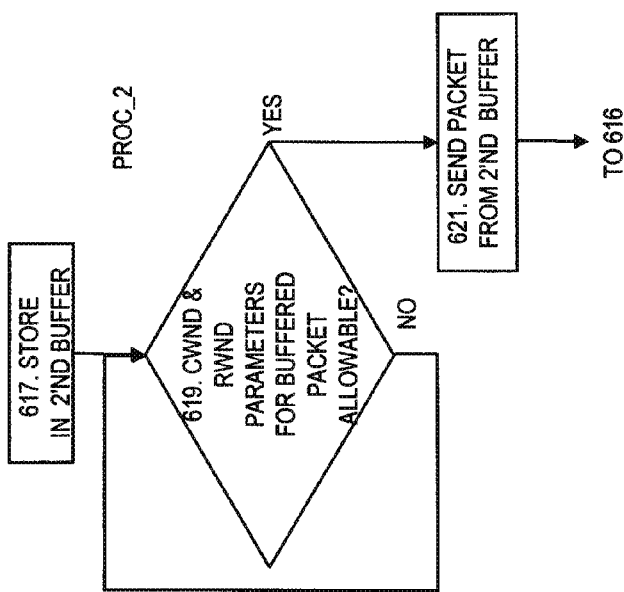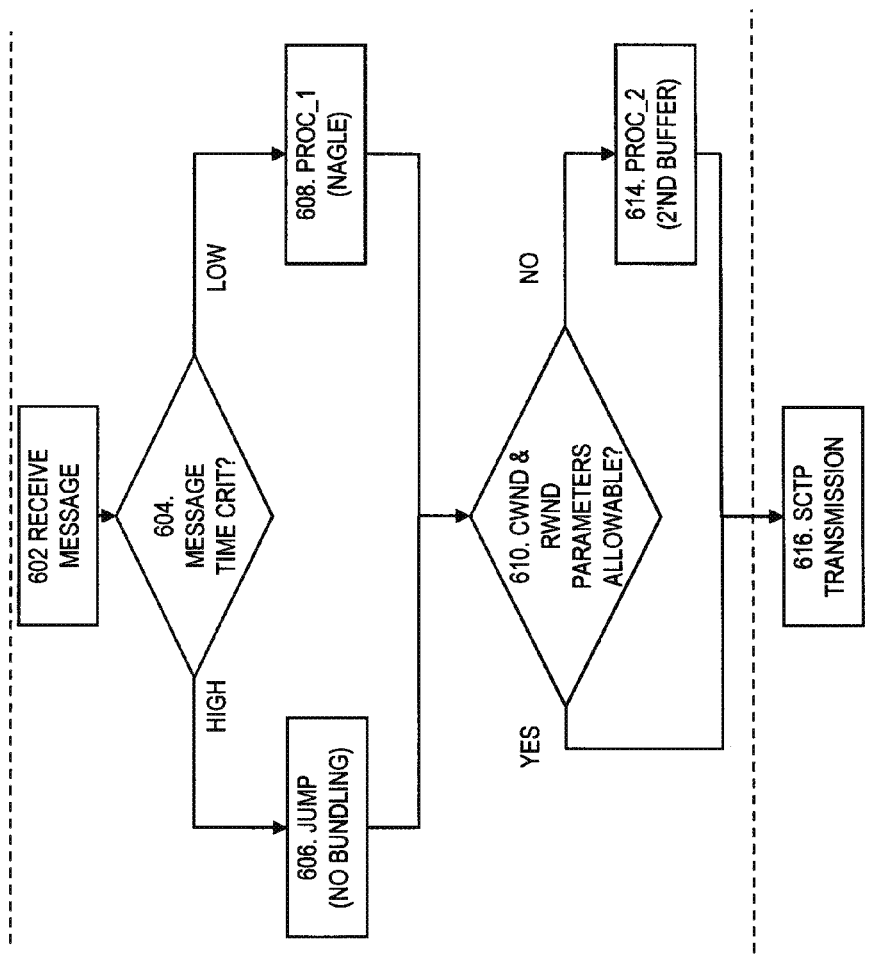
Fig. 6 – EMB. I

SCTP BUNDLING

CROSS-REFERENCE TO RELATED APPLICATIONS

This application claims priority to international patent application no. PCT/EP2013/075839, filed on Dec. 6, 2013, which is incorporated by reference.

TECHNICAL FIELD

This invention relates to the field of transport protocols in data and telecommunication systems. More particularly the invention relates to the Stream Control Transmission Protocol (SCTP) and methods and apparatuses therefore.

BACKGROUND

SCTP is a general-purpose transport layer protocol, like TCP and UDP, and operates above the IP layer. Like TCP, SCTP offers a point-to-point, connection oriented, reliable delivery transport service for applications communicating over an IP network and features powerful congestion control and packet loss recovery.

SCTP supports for multi-homing and partial ordering. Multihoming enables an SCTP host to establish a "session" with another SCTP host over multiple interfaces identified by separate IP addresses. Partial ordering lets SCTP provide in-order delivery of one or more related sequences of messages flowing between two hosts. Thus, SCTP can benefit applications that require reliable delivery and fast processing of multiple, unrelated data streams, c.f. "SCTP, New Transport Protocol for TCP/IP", Randall Stewart, Chris Metz, Cisco Systems, page 64, November-December 2001 http://computer.org/internet/IEEE Internet Computing.

SCTP is described in (1) RFC 4960 "Stream Control Transmission Protocol"; (2) RFC 6458 "Sockets API Extensions for the Stream Control Transmission Protocol (SCTP)"; (3) RFC 4165 "Signaling System 7 (SS7) Message Transfer Part 2 (MTP2)—User Peer-to-Peer Adaptation Layer (M2PA)"

SCTP is used in (1) 3GPP TS 36.412 "S1 signalling transport" (within TSG RAN "Evolved Universal Terrestrial Access Network (E-UTRAN)") and TS 36.413 "S1-AP Application Protocol" and (2) RFC 3588 or RFC 6733 "Diameter Base Protocol"

In some network places only one SCTP association between two nodes are allowed (like interface S1-MME between eNB and MME in LTE/EPC system, according to 3GPP TS 36.412, chapter 7), Diameter (according to RFC 6733) and M2PA (according to RFC 4165). At the same time, especially for S1-MME some traffic is time critical (should be delivered within ~10 ms) though most traffic, especially paging to UEs with high idle mode DRX, is not so time critical, fully ok if delivered within 100-200 ms.

For the M2PA protocol there is also a need as is uses two streams in each direction for each association. One stream is used for Link Status messages. The other stream is used for User Data messages. Separating the Link Status and User Data messages into separate streams allows M2PA to prioritize the messages in a manner similar to MTP2.

Diameter: RFC6733, 2.1 Transport, 6th §: "A given Diameter instance of the peer state machine must not use more than one transport connection to communicate with a given peer, unless multiple instances exist on the peer, in which, case a separate connection per process is allowed."

Bundling is including more than one SCTP data chunk (and/or SACK) in one SCTP message/IP datagram. This is particularly applicable and effective for small SCTP chunks (e.g. SACK, S1-AP paging messages, etc.). SCTP bundling reduces the number of IP datagrams sent.

In known SCTP systems, a Bundling Timer is set to a value in the range 0-10 ms (or more depending on application), to fulfil the timing requirements for the time-critical traffic, though that may be the minor part of the traffic. Thereby, one sacrifices network bandwidth efficiency and CPU load in end nodes and routers forwarding the datagrams between nodes, because of very little resulting bundling.

IETF recently published a new version of "A new data chunk for stream control transmission protocol", Network Working Group, Internet-Draft, Standards Track; R. Stewart et al. Oct. 20, 2013 (draft-stewart-tsvwg-sctp-ndata.txt). This document introduces a parameter SCTP_SS_PRIORITY: Scheduling with different priorities is used.

Streams having a higher priority will be scheduled first and when multiple streams have the same priority, the default scheduling should be used for them. The priority can be assigned with the sctp_stream_value struct. The higher the assigned value, the lower the priority, that is, the default value 0 is the highest priority and therefore the default scheduling will be used if no priorities have been assigned.

This document would seem to constitute a solution for accomplishing different priorities for e.g. Link Status Messages and User Data messages, for instance for the M2PA protocol example above.

However, the prior art examples above still leaves something to be desired in terms of capacity utilisation and speed.

SUMMARY

It is a first object of the invention to set forth a method for improving SCTP performance.

This object has been accomplished by a method for bundling and transmitting one or more upper layer application messages into a Stream Control Transmission Protocol, SCTP, packet in which one or more messages are bundled into a packet comprising at least a SCTP header and a payload portion, the packet having a fixed maximum length.

The method comprises receiving messages from an upper layer application; processing messages through a first process stage in which messages may be added to a first buffer for bundling and then to a secondary process stage in which the bundled messages/messages may be further stored in a second buffer until receiver window and congestion window properties are found to be allowable for transmission. Moreover, it comprises transmitting a SCTP packet of bundled messages on a SCTP association.

The method further comprises the steps of: receiving an upper layer application message; resolving the time criticality of the message according to at least two classes comprising at least a high time criticality; if high time criticality e.g. $T\_i=0$, transmitting further the message in a payload portion of a SCTP packet to the secondary stage without awaiting further bundling possibilities; if not high time criticality, processing the message in the first stage so as to potentially bundle the message with other messages.

It is a further object of the invention to set forth an arrangement for improving SCTP performance.

This object has been accomplished by the subject matter of claim 12.

Arrangement for bundling and transmitting one or more upper layer application messages into a Stream Control Transmission Protocol, SCTP, packet in which one or more messages are bundled into a packet comprising at least a SCTP header and a payload portion, the packet having a fixed maximum length. The arrangement is being adapted for receiving messages from an upper layer application; processing messages through a first process stage in which messages may be added to a first buffer for bundling and then to a secondary process stage in which the bundled messages/messages may be further stored in a second buffer until receiver window and congestion window properties are found to be allowable for transmission; transmitting a SCTP packet of bundled messages on a SCTP association. The arrangement is being further adapted for: receiving an upper layer application message; resolving the time criticality of the message according to at least two classes comprising at least a high time criticality; if high time criticality (T_i=0), transmitting further the message in a payload portion of a SCTP packet to the secondary stage without awaiting further bundling possibilities, and if not high time criticality, processing the message in the first stage so as to potentially bundle the message with other messages.

According to some of the embodiments of the invention, the time criticality of messages are taken into account so it is accomplished that both time-critical messages (typically minor part of occurring messages) and non-time-critical traffic messages (typically major part of occurring messages) are dealt with efficiently while from an overall perspective messages are having a high bundling factor for the non-time-critical/delay tolerant traffic in order to achieve a high bandwidth efficiency.

There is moreover provided according to further aspects of the invention an arrangement comprising first switch means for switching between direct processing to second stage and pro-cessing stage first processing means, the arrangement moreover comprising second switch means coupling said directly transmitted messages and messages processed in the first processing means, to the second stage.

According to another embodiment, the invention is implemented by means of a computer program utilizing a first and a second buffer.

BRIEF DESCRIPTION OF THE DRAWINGS

FIG. 1 shows basic elements of a data-corn network, such as a LTE/EPC utilizing among others SCTP.

FIG. 2 shows the processor load of a network node of FIG. 1 using SCTP depending on a bundling time.

FIG. 4 shows a first embodiment of an apparatus according to the invention.

FIG. 5 is a table relating to the first embodiment.

FIGS. 6 and 6A is a flow diagram relating to a method of the first embodiment.

DETAILED DESCRIPTION

In FIG. 1, basic elements of a data-corn network, such as a LTE/EPC (Long Term Evolution/Evolved Packet Core) network utilizing among others the SCTP protocol, are shown. The exemplary network could relate to a mobility management entity, MME_L, which communicates with a number of base stations, BN_1-BN_3 over SCTP associations, SCTP_1-SCTP_3. There could be more associations provided for the communication between two nodes, e.g. associations SCTP_1; SCTP_1'; and SCTP_1". The base stations communicate further with user entities UE_1-UE_n.

As is known, the protocols involved in the example above, comprises Internet Protocol, IP, Stream Control Transmission Protocol, SCTP, the so-called S1-AP application layer and the Network Access Stratum, NAS. The latter protocol is used between the mobile stations and the MME while, the other mentioned protocols are used between the base stations and the MME.

FIG. 2 shows the processor load of a network node of FIG. 1, the MME, using SCTP depending on the bundling time. As appear from the figure, the longer the bundling time, here referred to by the bundling time parameter, T_BCL used for the SCTP associations, the lower the processing load in the MME. Shorter bundling times will increase the load, but will lessen the latency of communicated messages.

Figure 3:
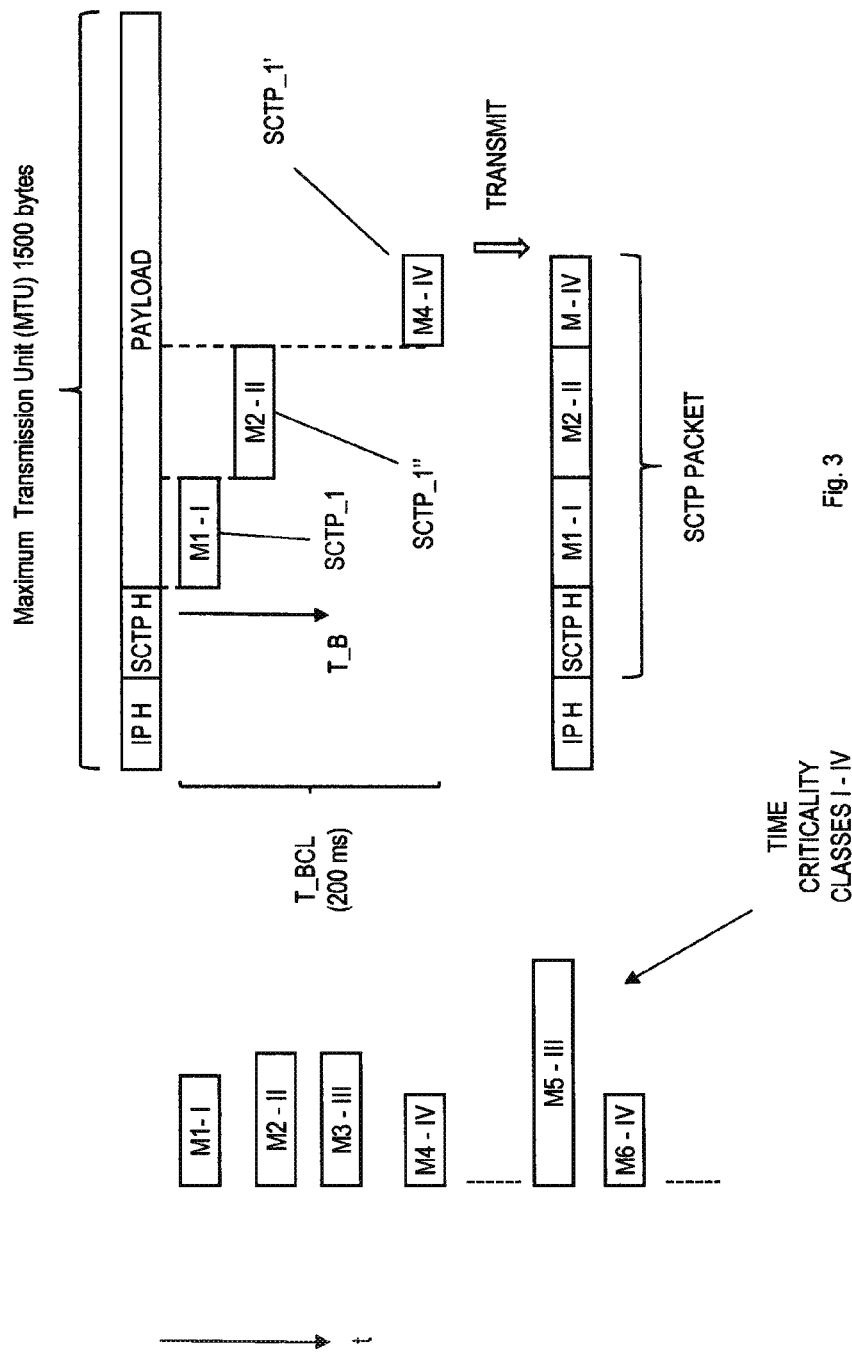
FIG. 3 is a diagram showing SCTP frame format and timing properties.

SCTP frame format and timing properties have been shown in FIG. 3.

Messages M1-M6 are received from an application layer and processed according to SCTP algorithms, whereby the received messages are bundled together in the SCTP packet, comprising a IP header, IP H, a SCTP header, SCTP H, and a payload portion.

The SCTP algorithm involves that one or more upper layer application messages are bundled into a Stream Control Transmission Protocol, SCTP, packet and transmitted on an SCTP association. The SCTP packet has a fixed maximum length amounting to 1500 bytes.

As shown in the example of FIG. 3, a timer with value T_BCL=200 ms is set when a first message is received. Within that time, the SCTP packet must be transmitted and the packet may be composed of those messages which are received within that time, such that the messages which are received within that time is bundled together in the payload portion of the SCTP packet.

According to the invention, the time criticality of messages are considered, here by means of example purely, indicated so as to belong to classes I-IV, in such a manner that each message is associated, or determined to be associated, with a given class.

FIG. 4 shows a first embodiment of an arrangement 1 according to the invention.

Figure 7:
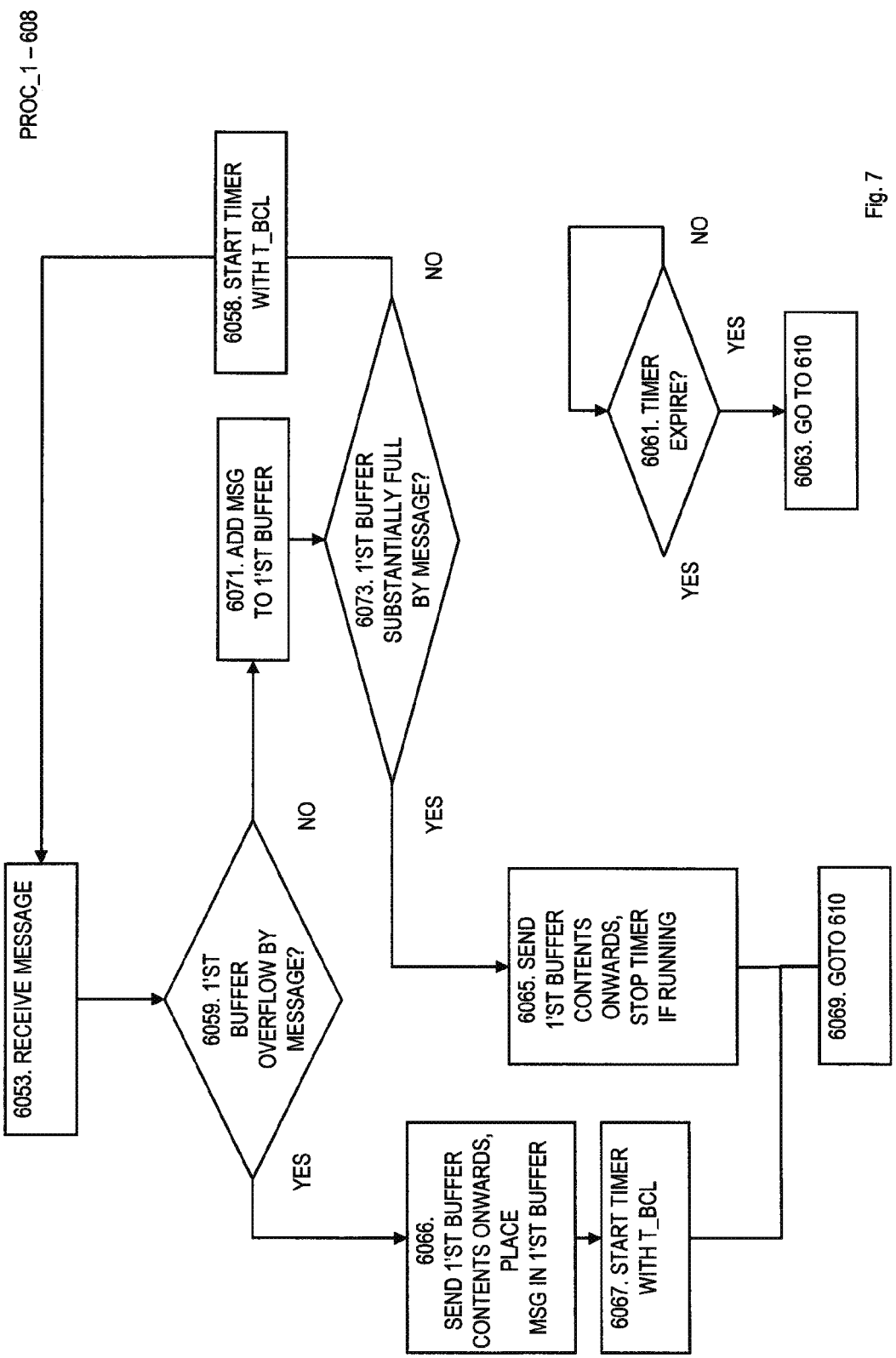
FIG. 7 is a further flow diagram relating to the first embodiment of the invention.

The arrangement 1 comprises a port 402 on which upper application layer messages are received, a switch SWTC 404 for distributing incoming messages, either via a direct stage, also denoted jump stage or via process stage comprising a first buffer 8021 in which processing stage 408 processing according to the known Nagle algorithm, or an algorithm according to the invention shown by the flow diagram of FIG. 7, is performed. Elements 402, 404 and 408 forms first stage in the arrangement 1. Subsequently, processing is undertaken by means of switch, SWTC 410, collecting paths from 406 and 408, and distributing messages into direct path 412 and second process stage 414 comprising a second buffer 8022. Finally, element 416 transmits the completed SCTP packet on a SCTP association. As shown messages are processed through a first process stage 406; 408 in which messages may be added to a first buffer 8021 for bundling and then to a secondary process 412, 414 stage.

The table shown in FIG. 5, various streams denoted by IETF numbers 0-10 have been shown. The time criticality according to the invention is rendered depending on the IETF stream number, such that, by example, stream numbers 7 and 10 are assigned a high time criticality whereas 0 is assigned a low time criticality.

FIGS. 6 and 6A a flow diagram relating to a method of the first embodiment is shown for bundling and transmitting one or more upper layer application messages into a Stream Control Transmission Protocol, SCTP, packet in which one or more messages M1-M6 are bundled into a packet comprising at least a SCTP header SCTP-H and a payload portion, wherein, as shown in FIG. 3, the packet is having a fixed maximum length corresponding to the MTU.

FIG. 6 shows the received messages are being delivered from e.g. an upper layer S1-AP application layer, on a port 402. The received messages 602, are processed according to step 604, in which the time criticality of the received message is investigated. If high time criticality, the method proceeds to step 606, if low, it proceeds to step 608.

Hence, the method is—resolving 604 the time criticality of the message according to at least two classes such as high and low; —if high, transmitting 406 further the message in a payload portion of a SCTP packet with minimal delay to the secondary stage without awaiting further bundling possibilities 408; —if low, processing the message in the first stage so as to potentially bundle the message with other messages 408.

In step 608, the message is processed according to the known Nagle process for bundling messages—or according to an alternative process for bundling shown in FIG. 7—here, in all instances referred to as process 1, after which the method goes to step 610.

In step 608, the message is carried on further with minimal delay—directly—without any bundling being carried out, to step 610. To emphasize the low delay, the message is indicated so as to jump directly further in step 606.

Step 610, corresponding to the function of switch 410, initially checks whether receiver window, RWND, and congestion window, CWND, properties are found to be allowable 619 for transmission; if yes, SCTP transmission takes place according to step 616 on a SCTP association, if not, the method proceeds to step 614, which is further shown in FIG. 6A.

The FIG. 6A procedure further stores in the second buffer 8022 the message until receiver window, RWND, and congestion window, CWND, properties are found to be allowable 619 for transmission. Step 621 indicates that the stored message is taken further to step 616, upon 619 parameters are fulfilled.

In other words, FIG. 6 shows processing of messages through a first process stage 406; 408 in which messages may be added to the first buffer 8021 for bundling and then to the secondary process 412, 414 stage in which the bundled messages/messages may be further stored in a second buffer 8022 until receiver window RWND and congestion window CWDN properties are found to be allowable 619 for transmission; and then transmitting a SCTP packet of bundled messages or possibly a single message on a SCTP association SCTP_1; SCTP_2; SCTP_3.

In FIG. 7, an embodiment of the Nagle like process 1 according to the invention is shown in more detail. First an upper layer application message M1-M6 is received, step 6053. Then, after reception, it is assessed in step 6059 whether a buffer overflow of the first buffer would occur by adding the received message to the contents of the first buffer.

If yes, the first buffer contents is sent step 6066 to the second stage without adding the received message in the first buffer. Subsequently, the received message is placed in the first buffer.

If no, the received message is added in step 6071 to the first buffer.

If the first buffer is not substantially full, after 6071, a timer of a predefined timer value T_BCL is started 6058, as indicated in FIG. 3, and a further message is awaited. Likewise, the timer is also started with value T_BCL after step 6067, mentioned above.

If, at any time, the timer expires 6061, the buffer contents of the first buffer is transmitted step 6063 to the second stage.

If the first buffer is rendered substantially full by the received message 6073, the buffered content is sent 6065 onwards to the second stage, and the method proceeds to step 6069, going to step 610 of the second stage.

Turning back to step 604, the time criticality may be resolved 604 according to SCTP stream numbers, such that at least one predetermined SCTP stream is determined to have a low time criticality. For instance, if the SCTP stream number is 0, the method is resolving a low time criticality, otherwise, for stream numbers 7 and 10 it is resolved that the streams have a high time criticality.

Figures 8, 8A, 8B:
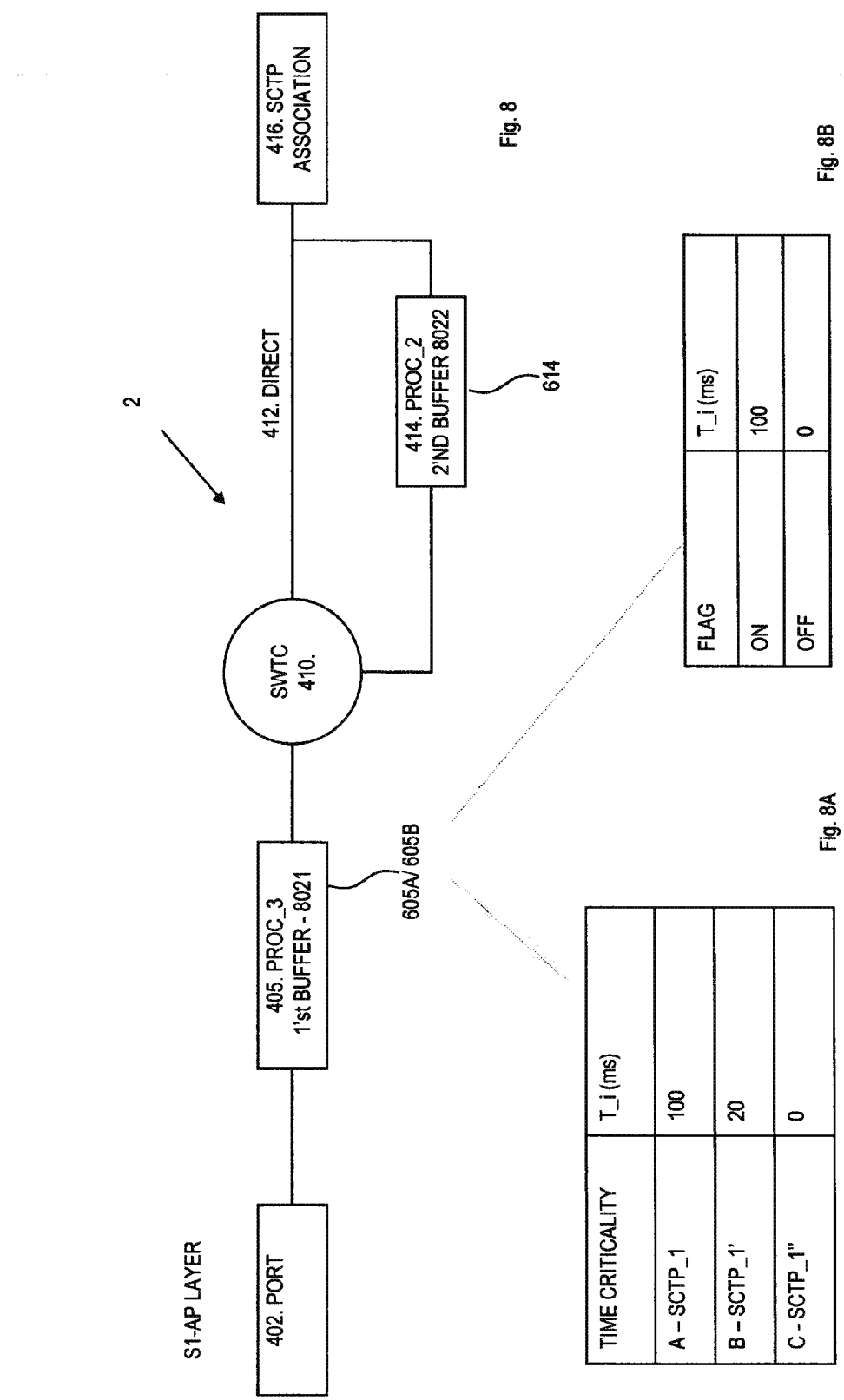
FIG. 8 shows a second embodiment of an apparatus according to the invention.
FIGS. 8A and 8B are tables relating to the second embodiment.
Figure 9:
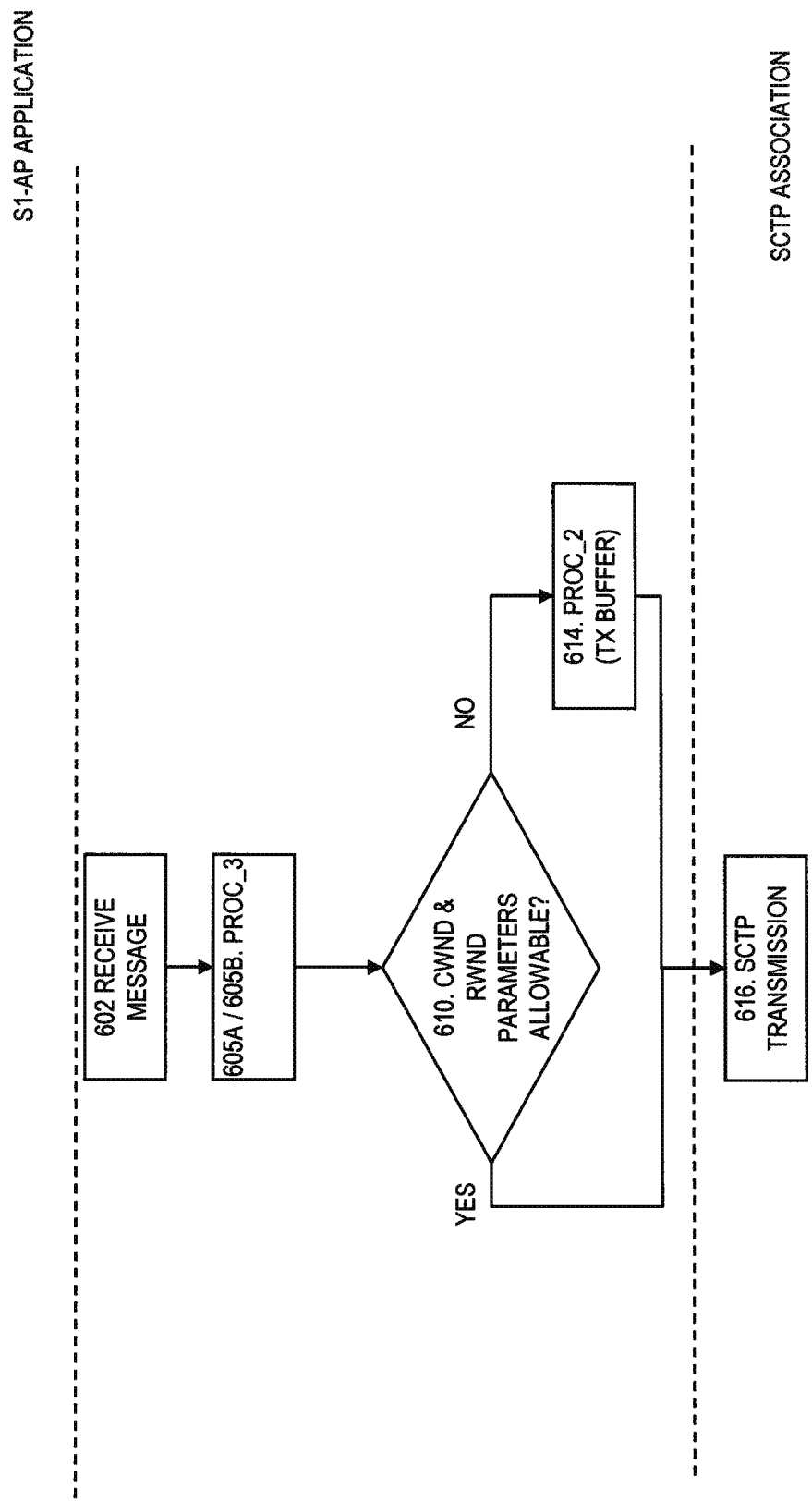
FIGS. 9 and 10 are flow diagrams relating to a method of the second embodiment.

FIG. 8 shows a second embodiment of an apparatus according to the invention.

According to FIG. 8 there is provided a port 402 on which upper S1-AP application layer messages are received, a first process stage 405, also denoted process 3, comprising a first buffer 8021, a switch 410 distributing messages either directly 412, or through a stage 414. From path 412 and 414, messages or bundled messages are transmitted in 416 on a SCTP association. Thus, the second stage of FIG. 8 corresponds to the second stage of FIG. 4.

FIGS. 8a and 8b are exemplary tables relating to the second embodiment.

According to the second embodiment, FIG. 8a—shown in FIG. 810—the method comprises the steps of—receiving 6053 an upper layer application message M1-M6; —determining 6054 a timer value T_i associated with the received message, and storing said determined value 6054.

From step 6071, it is investigated whether the first buffer is empty before receiving the message, and the method is starting 6058 a timer with the determined timer value.

From step 6071, If the first buffer is not empty before receiving the message, it is evaluated 6055 whether the timer value of the recently received message would effectuate a sooner expiration than a presently running timer for instance expressed as T_i<count down value CNT, and if so, the method is restarting 6057 a timer with the stored timer value T_i and a next message is awaited 6053. If the condition 6055 is not found to be true, the process goes to step 6053.

If yes to step—assessing 6059 whether a buffer overflow of the first buffer would occur by adding the received message to the contents of the first buffer—the method is sending 6066 the first buffer contents to the second stage without adding the first message in the buffer and the method is subsequently placing the received message in the first buffer. Subsequently the method is restarting 6067 the timer with the determined timer value T_i associated with the received message.

Again—if the timer expires, at any time, the buffer contents of the first buffer are transmitted step 6063 to the second stage, going to step 610.

Figure 13:
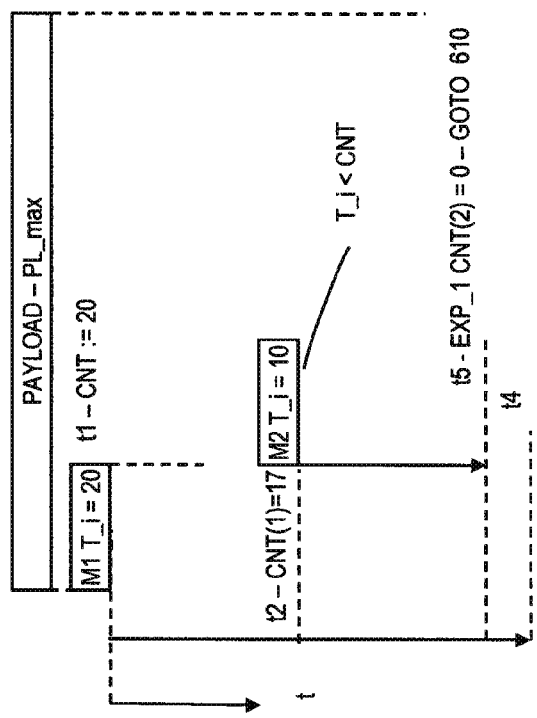
FIGS. 12 and 13 are scenarios relating to the second embodiment.
Figure 12:
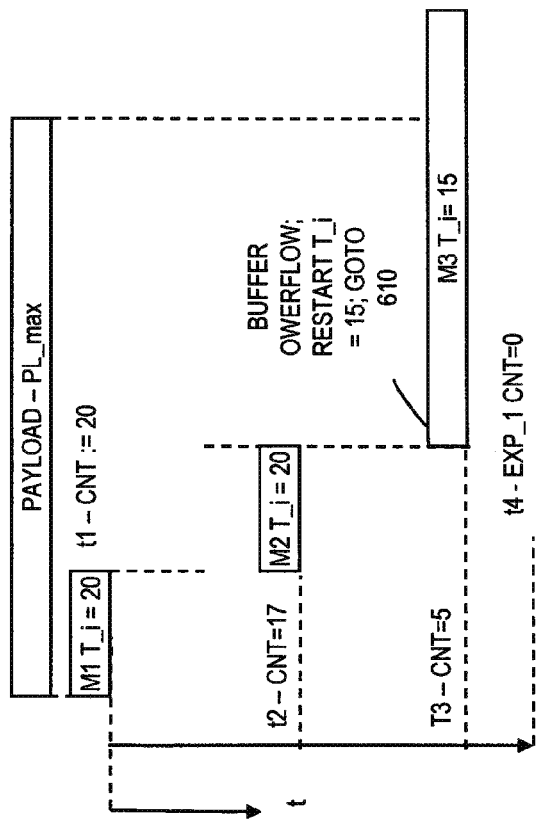

In FIGS. 12 and 13 the effects of the FIG. 8a method is shown. In FIG. 12, a first message is received M1 at time t1 is determined according to the invention so as to have a T_i value 20 associated with it. This value is determined in step 6054 and since the message is a first message the 1$^{st}$ buffer is empty before receiving the message step 6075. Consequently, in step 6058, the timer is started with value T_i. At t1 the count value CNT is 20 and this value is counted down with time.

At time t2, at count value CNT 17, a new message M2 is received. This message is determined to a have a T_i value of 20 associated with it. Since the first buffer 8021 is not empty before the first message M2 is received, step 6075, the method process to step 6055, in which it is investigated whether the stored T_i value is less than the current count value CNT. 20 is not less than 17 and the method proceeds without restarting the timer with a new value. The method goes directly to step 6053.

When a third message M3 is received at T3, the timer has a count of 5, and has hence not expired, which would first happen at time T4. However, message M3, has a size which would result in a buffer overflow, considering the format of SCTP with a Maximum Transmission Unit, MTU, and this is determined according to step 6059.

The fixed SCTP format indicated in FIG. 3 would not accommodate bundling with the recently received message M3.

Consequently, according to step 6066, the buffer contents, that is, what has been bundled so far, messages M1 and M2, is sent onwards whereupon the recent message M3 is placed in the $1^{st}$ buffer and the timer is started with determined value of M3. In this case M3 has an exemplary value T_i=15.

In FIG. 13, the exemplary situation differs in that at t2, the message M2 is determined to have a value T_i=10, which is lower than the current count value of CNT. Consequently, the timer is restarted with the recently determined value of the recent message M2.

Subsequently, the timer expires at time t5, and the bundled message consisting M1 and M2 is sent onwards to the second stage, before the initially set timer would have expired at time t4.

Figure 10:
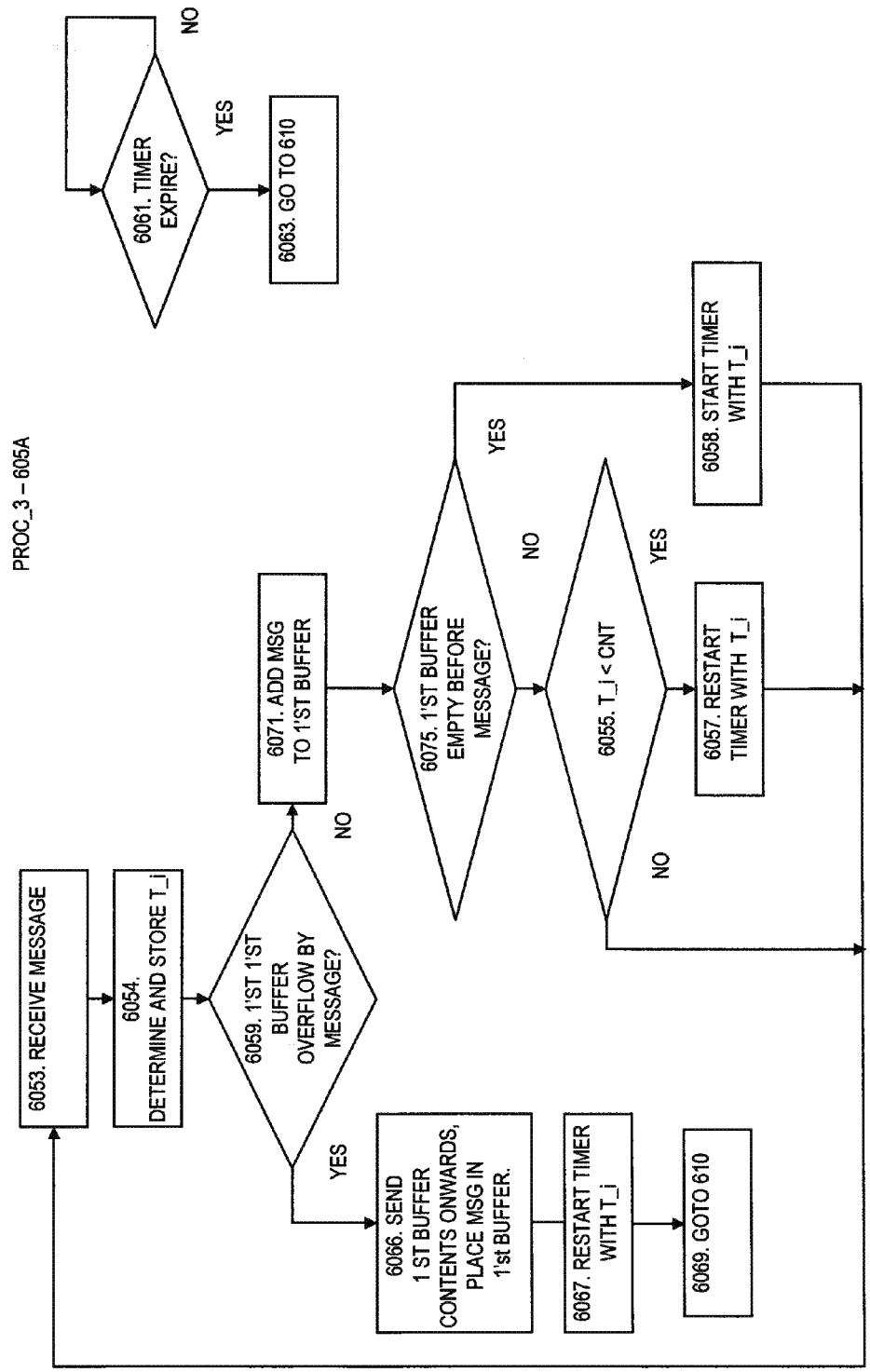
Figure 11:
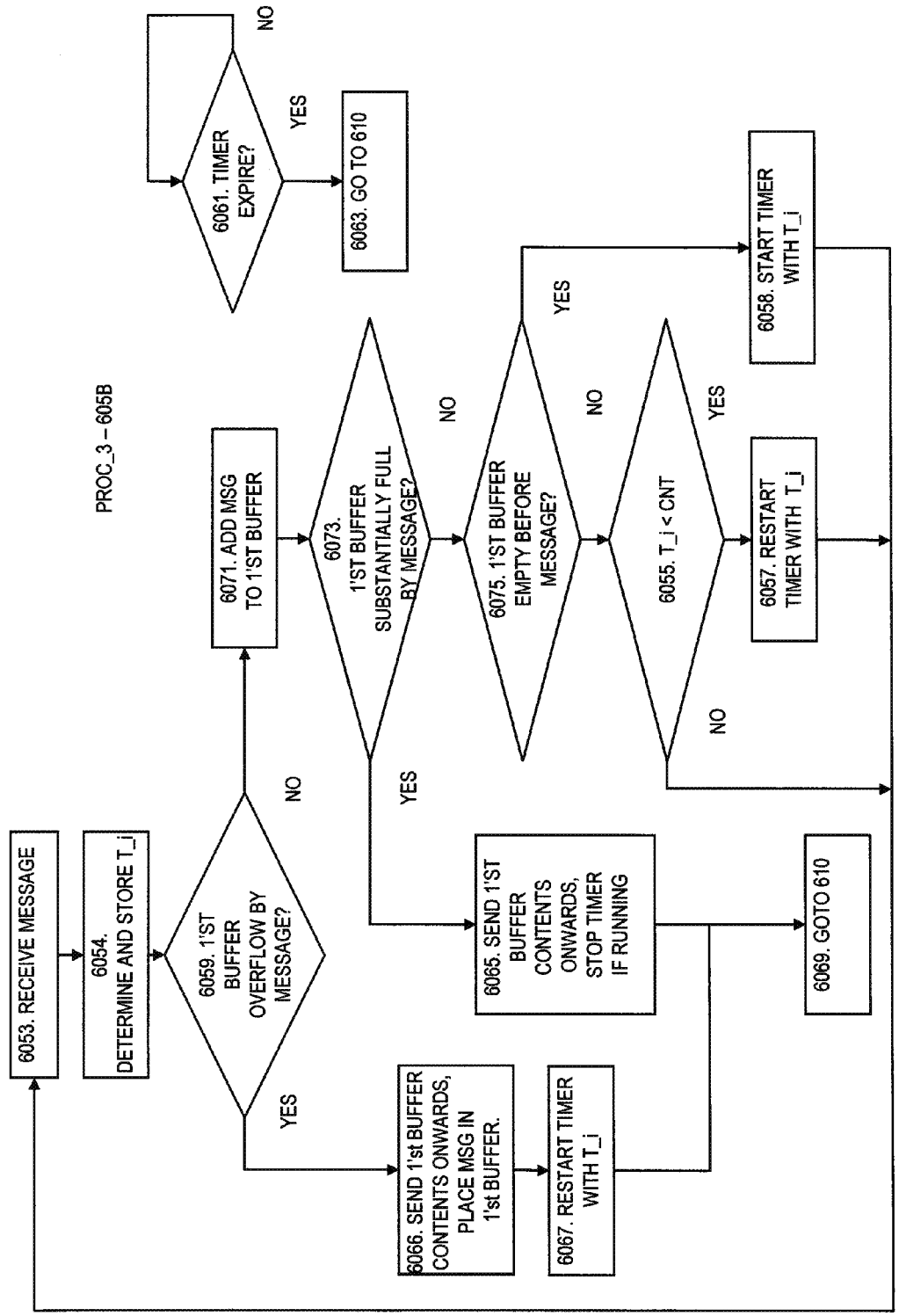
FIG. 11 is a variant of the embodiment shown in FIG. 10.

In FIG. 11, an alternative method has been shown to the method shown in FIG. 10.

The method comprises additional steps 6073 and 6055, step 6073 taking place in between steps 6071—add message to first buffer—and 6075 first buffer empty before message. In step 6073, it is investigated whether the first buffer is rendered full—or substantially full—by the received message. Hence if the recent message exactly fills up the format, the method goes to step 6065. According to the alternative option, the criterion is fulfilled when the buffer would have been made so full that any subsequent message would lead to a buffer overflow, e.g. a message of a minimum size. According to FIG. 11, there is no need to wait for buffer overflow, instead action is taken directly and the buffer contents are transmitted onwards in step 6065 while stopping any running timer.

Turning back to the tables of FIGS. 8a and 8b, various ways of determining the timer value T_i are envisaged according to the invention.

In FIG. 8a, the determination of the timer value associated with the received message and depends on a classification, wherein each of a plurality of streams SCTP_1; SCTP_1'; SCTP_1" is assigned a predetermined timer value T_i.

In FIG. 8b, the determination of the timer value associated with the received message depends on a parameter value or flag value in the received message. For instance is the flag is ON, a value T_i 100 ms is determined, and if the flag is OFF, a T_i value of 0 ms is determined. The latter has the effect of step 6061 being fulfilled whereupon the received message is directly transmitted to the second stage with minimal delay for second stage processing.

Figure 14:
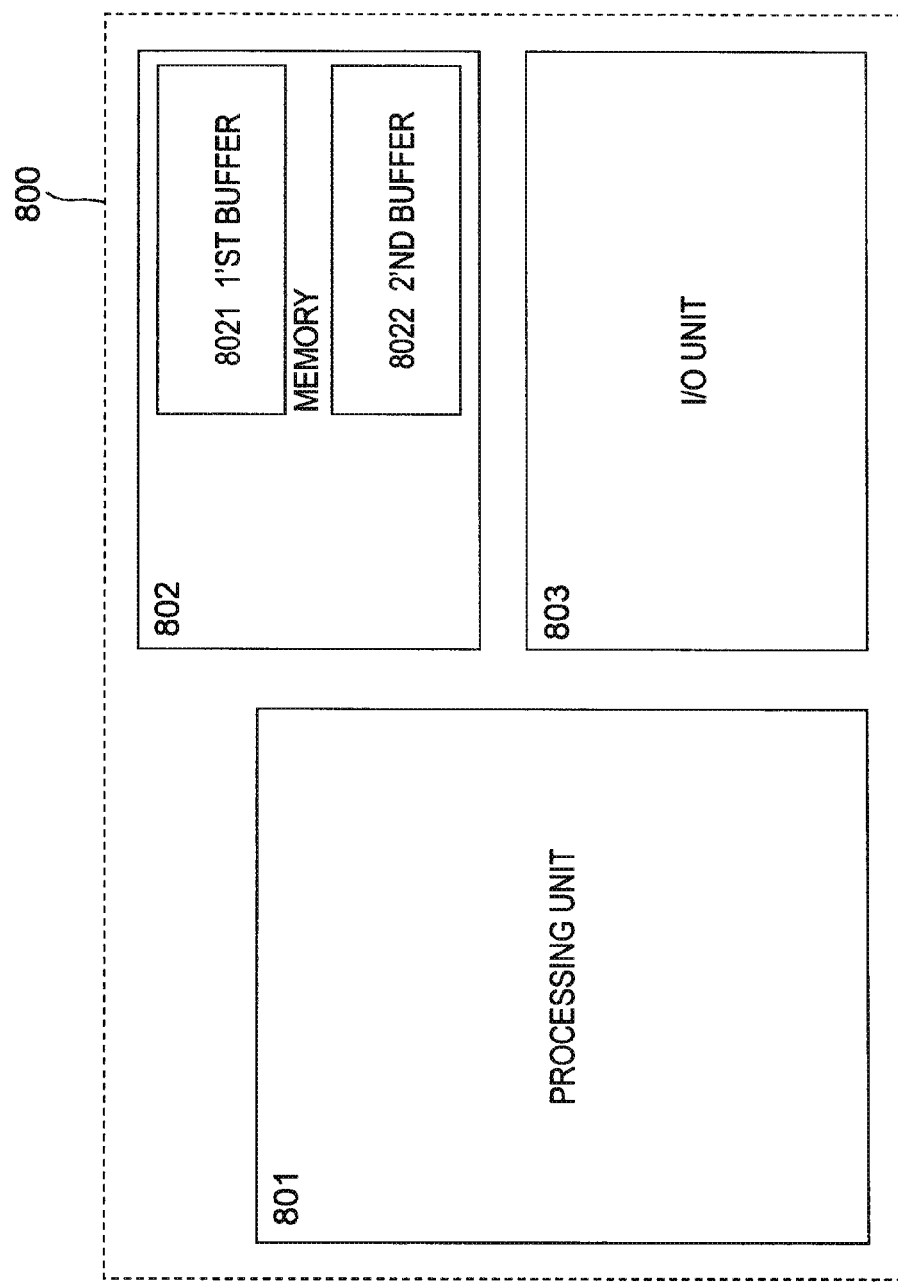
FIG. 14 shows a further apparatus according to embodiments of the invention.

In FIG. 14, a further implementation of the arrangement according to the invention has been shown which constitute an alternative to the FIG. 4 and fig. embodiments. This arrangement 800, comprises a processing unit 801, a memory 802, comprising the first buffer 8021 and the second buffer 8022, and a input/output unit 803.

According to an aspect of the Invention a longer bundling timer in the SCTP layer is used for "less time critical" requests and a shorter bundling timer is used for "more time critical" requests. A demonstrated above, this can be done on a single SCTP stream especially if the messages do not need to be ordered or different SCTP stream for the two types of traffic again with different bundling timers.

In summary, in order to take into account the time criticality of SCTP messages, at least the following embodiments have been provided according to the invention:

(1) According to an embodiment of the invention, as moreover shown in FIGS. 8, 10 and 11, a parameter "bundling timer value", T_i, may be introduced. Depending on a timer value, the SCTP processing according to the invention will bundle the message or send the bundled complete message and transmit it onwards at a time which depends on a first message was put into bundling queue of the association and which also depends on a latest specified value. So, generally, if a number of messages with large timer values have been put into the bundling queue of the association, and then a message with low enough timer value is added, all the messages will be bundled into one packet and sent immediately.

(2) A bundling on/off flag may be provided according to an embodiment of the invention as shown in FIG. 8B. Depending on flag value the SCTP processing according to embodiments of the invention will bundle messages or send messages immediately without bundling. It is noted that this embodiment constitutes is a special case of 1, e.g. having bundling timer of 0 for the time critical messages.

(3) It is possible according to an embodiment shown in FIG. 5 and FIG. 6, to assign one set of streams for the time-critical data which should be immediately delivered or have a short bundling timer. The behaviour for other streams will be similar to prior art systems or be associated with a longer bundling timer and possibly different for each SCTP stream. This feature would be applicable for the S1-MME interface in LTE, using stream 0 with a long bundling timer, and the others with immediate delivery as shown in FIG. 5. The opposite, time-critical data on stream 0, and other streams handled as normal, with bundling would be applicable for M2PA. It should be noted, that since this is a property established at stream setup this has less overhead in the SCTP API between application level and SCTP stack level. It should also be noted that less time critical messages are often less important messages and might be candidates for being dropped. Using different SCTP streams for less important messages allows the receiver to drop or delay those received messages if the receiver is overloaded while it still be able to quickly handling the more important time critical messages on another SCTP stream.

In conclusion, according to the invention there is provided:

A method for bundling and transmitting one or more upper layer application messages into a Stream Control Transmission Protocol, SCTP, packet in which one or more messages M1-M6 are bundled into a packet comprising at least a SCTP header SCTP-H and a payload portion MTU, the packet having a fixed maximum length, the method comprising: receiving 6053 messages from an upper layer application 402; processing messages through a first process stage 405, 406; 408 in which messages may be added to a first buffer 8021 for bundling and then to a secondary process 412, 414 stage in which the bundled messages/messages may be fur-ther stored in a second buffer 8022 until receiver window RWND and congestion window CWND properties are found to be allowable 619 for transmission; and transmitting a SCTP packet of bundled messages on a SCTP association SCTP_1; SCTP_2; SCTP_3.

The method comprising the steps: receiving 602; 6053 an upper layer application message M1-M6; resolving 604, 6054 the time criticality of the message according to at least two classes comprising at least a high time criticality; if high time criticality T_i=0, transmitting 406, 6061, 6063 further the message in a payload portion of a SCTP packet to the secondary stage without awaiting further bundling possibilities 408; if not high time criticality, processing the message in the first stage so as to potentially bundle the message with other messages 408, 6071.

The processing of the received message so as to potentially bundle the received message with other messages 408, may involve assessing 6059 whether a buffer overflow of the first buffer would occur by adding the received message to the contents of the first buffer, and if so, sending 6066 the first buffer contents to second stage without adding the received message in the first buffer and subsequently placing the received message in the first buffer; if not, adding 6071 the received message to the first buffer, and if the first buffer is not substantially full, starting 6058 a timer of a predefined timer value T_BCL and awaiting a further message.

If the timer expires 6061 at any time, the method is transmitting 6063 the buffer contents of the first buffer to the second stage.

There is further provided that if the first buffer is rendered substantially full by the received message 6073, sending 6065 the buffered content onwards to the second stage.

The time criticality may be resolved 604 according to SCTP stream numbers, such that at least one predetermined SCTP stream is determined as having a low time criticality.

For instance, if the SCTP stream number is 0, resolving a low time criticality, otherwise resolving a high criticality.

As an alternative, the method may imply that the step of resolving 604, 6054 the time criticality of the message according to at least two classes comprising at least a high time criticality, involves determining 6054 a timer value T_i associated with the received message, and storing said determined value 6054.

Further, the method may comprise the steps of if the first buffer is empty before receiving the message, starting 6058 a timer with the determined timer value; if the first buffer is not empty before receiving the message, evaluating 6055 whether the timer value of the recently received message would effectuate a sooner expiration than a presently running timer, and if so, restarting 6057 a timer with the stored timer value T_i awaiting a next message and if not so, awaiting 6053 a next a next message.

Also the step of, if the first buffer is substantially full, sending 6065 the contents of the first buffer onwards while stopping any running timer, may be comprised.

According to a method, the steps of: assessing 6059 whether a buffer overflow of the first buffer would occur by adding the received message to the contents of the first buffer, and if so, sending 6066 the first buffer contents to second stage without adding the first message in the buffer and subsequently placing the received message in the first buffer; and—restarting 6067 the timer with the determined timer value T_i associated with the received message, may be carried out.

Again, if at any time, the timer expires, the step, transmitting 6063 the buffer contents of the first buffer to the second stage, may be provided.

The determination of the timer value associated with the received message may depend on a classification, wherein each of a plurality of streams SCTP_1; SCTP_1'; SCTP_1" is assigned a predetermined timer value T_i.

The determination of the timer value associated with received message may also depend on a parameter value or flag value in the received message.

According to embodiments of the invention there is further provided an arrangement for bundling and transmitting one or more upper layer application messages into a Stream Control Transmission Protocol, SCTP, packet in which one or more messages M1-M6 are bundled into a packet comprising at least a SCTP header SCTP-H and a payload portion, the packet having a fixed maximum length, the arrangement being adapted for: receiving 6053 messages from an upper layer application 402; processing messages through a first process stage 405, 406; 408 in which messages may be added to a first buffer 8021 for bundling and then to a secondary process 412, 414 stage in which the bundled messages/messages may be further stored in a second buffer 8022 until receiver window RWND and congestion window CWND properties are found to be allowable 619 for transmission; transmitting a SCTP packet of bundled messages on a SCTP association SCTP_1; SCTP_2; SCTP_3; the arrangement being adapted for: receiving 602; 6053 an upper layer application message M1-M6; resolving 604, 6054 the time criticality of the message according to at least two classes comprising at least a high time criticality; if high time criticality T_i=0, transmitting 406, 6061, 6063 further the message in a payload portion of a SCTP packet to the secondary stage without awaiting further bundling possibilities 408; if not high time criticality, processing the message in the first stage so as to potentially bundle the message with other messages 408, 6071.

Moreover, the processing of the received message so as to potentially bundle the received message with other messages 408, may involve: assessing 6059 whether a buffer overflow of the first buffer would occur by adding the received message to the contents of the first buffer, and if so, sending 6066 the first buffer contents to second stage without adding the received message in the first buffer and subsequently placing the received message in the first buffer; if not, adding 6071 the received message to the first buffer, and if the first buffer is not substantially full, starting 6058 a timer of a predefined timer value T_BCL and awaiting a further message; while at any time, if the timer expires 6061, transmitting 6063 the buffer contents of the first buffer to the second stage.

The Arrangement may be further being adapted so wherein the step of resolving 604, 6054 the time criticality of the message ac-cording to at least two classes comprising at least a high time criticality, involves: determining 6054 a timer value T_i associated with the received message, and storing said determined value 6054; if the first buffer is empty before receiving the message, starting 6058 a timer with the determined timer value; if the first buffer is not empty before receiving the message, evaluating 6055 whether the timer value of the recently received message would effectuate a sooner expiration than a presently running timer, and if so, restarting 6057 a timer with the stored timer value T_i awaiting a next message and if not so, awaiting 6053 a next a next message.

If the if first buffer is substantially full, the arrangement may be sending 6065 the contents of the first buffer onwards while stopping any running timer.

According to further embodiments, the arrangement is assessing 6059 whether a buffer overflow of the first buffer would occur by adding the received message to the contents of the first buffer, and if so, sending 6066 the first buffer contents to second stage without adding the first message in the buffer and subsequently placing the received message in the first buffer; and—restarting 6067 the timer with the determined timer value T_i associated with the received message.

The arrangement may comprise a processor unit 801 and a memory 802 and wherein said memory is containing instructions executable by said processor, the arrangement 800 communicating with the upper application layer and the SCTP association by at least one input/output unit 803, the first buffer 8021 and the second buffer 8022 being comprised in a memory 802.

The arrangement may comprise first switch means 404 for switching between direct processing 406 to second stage and processing stage first processing means 408, the arrangement moreover comprising second switch means 410 coupling said directly transmitted messages 406 and messages processed in the first processing means 408, to the second stage.

Computer program or computer program product is also provided, comprising instructions for carrying out the steps of the method according to above.

The arrangement may comprise a processor unit 801 and a memory 802 and wherein said memory is containing instructions executable by said processor, the arrangement 800 communicating with the upper application layer and the SCTP association by at least one input/output unit 803, the first buffer 8021 and the second buffer 8022 being comprised in a memory 802, wherein the processor is adapted to carry out a computer program, comprising instructions for carrying out the steps of the method described above.

Advantages of Embodiments of the Invention

Compared to existing SCTP stacks using a "long bundling value" for all messages in an SCTP association this invention will result in faster response for time critical messages with very little increase of datagrams being sent.

Compared to existing SCTP stacks using a "short or zero bundling value" for all messages in an SCTP association this invention will result in a reduction of datagrams being sent without negatively impacting time critical message response time.

One of the common use cases envisioned is paging in LTE along the principles shown in FIG. 1.

In practice, on the S1-MME interface between MME and eNodeB the most common message from MME to eNodeB is the S1-AP page message. This message serves to trigger paging to the UE. The UE may be in an idle mode DRX cycle of up to 2.56 seconds the UE's idle DRX cycle is known by MME. As a result, the UE cannot even respond to the page on average in a time less than ½ of the idle mode DRX cycle. So this message is not very time critical and can afford to be delayed by tens of milliseconds with no noticeable impact to the end user experience e.g. average delay of 1.28 seconds vs. 1.32 seconds with a bundling of 40 ms is not noticeable to an end user. Furthermore, page retries at a broader scope are intrinsically more delay tolerate since they have already had a high delay due to failure at lower scope. The high frequency of paging, small page message size and delay tolerance of paging makes it highly desirable to bundle these paging messages. For this exemplary application of embodiments of the invention, this results in a much lower rate of datagrams from the MME to the eNodeB, while it reduces load on the MME SCTP stack, internal and external routers, and the eNodeB SCTP stack.

ABBREVIATIONS

3GPP—3rd Generation Partnership Project
DRX—Discontinuous Reception
eNB—evolved Node B (radio base station for LTE)
EPC—Evolved Packet Core
LTE—Long Term Evolution
M2PA—Message Transfer Part 2 User Peer-to-Peer Adaptation Layer
MME—Mobility Management Entity
RFC—Request For Comment
S1-MME—Interface between MME and eNB in the LTE/EPC system
SCTP—Stream Control Transmission Protocol
TSG—Technical Specification Group (within 3GPP)

The invention claimed is:

1. A method for bundling and transmitting one or more upper layer application messages into a Stream Control Transmission Protocol (SCTP) packet in which one or more messages are bundled into a packet comprising at least a SCTP header and a payload portion, the packet having a fixed maximum length, the method comprising:
receiving messages from an upper layer application;
processing messages through a first process stage in which messages may be added to a first buffer for bundling and then to a secondary process stage in which the bundled messages or the messages may be further stored in a second buffer until receiver window and congestion window properties are found to be allowable for transmission;
transmitting a SCTP packet of bundled messages on a SCTP association;
receiving an upper layer application message;
resolving the time criticality of the received message according to at least two classes comprising at least a high time criticality;
if high time criticality, transmitting further the received message in a payload portion of a SCTP packet to the secondary stage without awaiting further bundling possibilities; and
if not high time criticality, processing the received message in the first stage so as to potentially bundle the message with other messages, wherein
the step of resolving the time criticality of the message according to at least two classes comprising at least a high time criticality comprises:
determining a timer value associated with the received message, and storing said determined value; and
starting a timer with the determined timer value if the first buffer is empty before receiving the message, otherwise evaluating whether the timer value of the recently received message would effectuate a sooner expiration than a presently running timer, and if so, restarting a timer with the stored timer value awaiting a next message and if not so, awaiting a next a next message.

2. The method according to claim 1, wherein the processing of the received message so as to potentially bundle the received message with other messages comprises:
assessing whether a buffer overflow of the first buffer would occur by adding the received message to the contents of the first buffer, and if so, sending the first buffer contents to second stage without adding the received message in the first buffer and subsequently placing the received message in the first buffer, and if not, adding the received message to the first buffer, and
if the first buffer is not substantially full, starting a timer of a predefined timer value and awaiting a further message; and
if the timer expires, transmitting the buffer contents of the first buffer to the second stage.

3. The method according to claim 1, wherein if the first buffer is rendered substantially full by the received message, sending the buffered content onwards to the second stage.

4. The method according to claim 1, wherein the time criticality is resolved according to SCTP stream numbers, such that at least one predetermined SCTP stream is determined as having a low time criticality.

5. The method according to claim 4, wherein if the SCTP stream number is 0, resolving a low time criticality, otherwise resolving a high criticality.

6. The method according to claim 1, wherein
sending the contents of the first buffer onwards while stopping any running timer in response to determining that the first buffer is substantially full.

7. The method according to claim 1, further comprising:
determining whether a buffer overflow of the first buffer would occur by adding the received message to the contents of the first buffer; and
in response to determining whether a buffer overflow of the first buffer would occur by adding the received message to the contents of the first buffer, sending the first buffer contents to second stage without adding the first message in the buffer and subsequently placing the received message in the first buffer; and restarting the timer with the determined timer value associated with the received message.

8. The method according to claim 1, further comprising transmitting the buffer contents of the first buffer to the second stage in response to the timer expiring.

9. The method according to claim 1, wherein the step of determining the timer value associated with the received message comprises determining the timer value based on a classification, wherein each of a plurality of streams is assigned a predetermined timer value.

10. The method according to claim 1, wherein the step of determining the timer value associated with received message comprises determining the timer value based on a parameter value or flag value in the received message.

11. An Arrangement for bundling and transmitting one or more upper layer application messages into a Stream Control Transmission Protocol (SCTP) packet in which one or more messages are bundled into a packet comprising at least a SCTP header and a payload portion, the packet having a fixed maximum length, the arrangement being adapted for:
receiving messages from an upper layer application;
processing messages through a first process stage in which messages may be added to a first buffer for bundling and then to a secondary process stage in which the bundled messages or the messages may be further stored in a second buffer until receiver window and congestion window properties are found to be allowable for transmission;
transmitting a SCTP packet of bundled messages on a SCTP association;
receiving an upper layer application message;
resolving the time criticality of the message according to at least two classes comprising at least a high time criticality;
if high time criticality, transmitting further the message in a payload portion of a SCTP packet to the secondary stage without awaiting further bundling possibilities; and
if not high time criticality, processing the message in the first stage so as to potentially bundle the message with other messages, wherein
the step resolving the time criticality of the message according to at least two classes comprising at least a hid time criticality comprises:
determining a timer value associated with the received message, and storing said determined value;
if the first buffer is empty before receiving the message, starting a timer with the determined timer value; and
if the first buffer is not empty before receiving the message, evaluating whether the timer value of the recently received message would effectuate a sooner expiration than a presently running timer, and if so, restarting a timer with the stored timer value awaiting a next message and if not so, awaiting a next a next message.

12. The arrangement according to claim 11, wherein the processing of the received message so as to potentially bundle the received message with other messages comprises:
assessing whether a buffer overflow of the first buffer would occur by adding the received message to the contents of the first buffer, and if so, sending the first buffer contents to second stage without adding the received message in the first buffer and subsequently placing the received message in the first buffer;
if not, adding the received message to the first buffer, and if the first buffer is not substantially full, starting a timer of a predefined timer value and awaiting a further message; while at any time,
if the timer expires, transmitting the buffer contents of the first buffer to the second stage.

13. The arrangement according to claim 11, wherein, if the first buffer is rendered substantially full by the received message, sending the buffered content onwards to the second stage.

14. The arrangement according to claim 11, wherein the time criticality is resolved according to SCTP stream numbers, such that at least one predetermined SCTP stream is determined as having a low time criticality.

15. The arrangement according to claim 14, wherein if the SCTP stream number is 0, resolving a low time criticality, otherwise resolving a high criticality.

16. The arrangement according to claim 11, wherein, if the first buffer is substantially full, sending the contents of the first buffer onwards while stopping a running timer.

17. The arrangement according to claim 11, further comprising
determining whether a buffer overflow of the first buffer would occur by adding the received message to the contents of the first buffer, and if so,
sending the first buffer contents to second stage without adding the first message in the buffer and subsequently placing the received message in the first buffer; and restarting the timer with the determined timer value associated with the received message.

18. The arrangement according to claim 11, wherein, if the timer expires, transmitting the buffer contents of the first buffer to the second stage.

19. The arrangement according to claim 11, wherein the determination of the timer value associated with the received message depends on a classification, wherein each of a plurality of streams is assigned a predetermined timer value.

20. The arrangement according to claim 11, wherein the determination of the timer value associated with received message depends on a parameter value or flag value in the received message.

21. The arrangement according to claim 11, comprising a processor unit and a memory and wherein said memory is containing instructions executable by said processor, the arrangement communicating with the upper application layer and the SCTP association by at least one input/output unit, the first buffer and the second buffer being comprised in a memory.

22. A computer program product comprising a non-transitory computer readable medium storing instructions for carrying out the steps of the method of claim 1.

* * * * *